(12) United States Patent
Lin

(10) Patent No.: US 11,177,085 B2
(45) Date of Patent: Nov. 16, 2021

(54) SLOWING MECHANISM FOR SWITCHING APPARATUS AND SWITCHING APPARATUS

(71) Applicant: ABB Schweiz AG, Baden (CH)

(72) Inventor: Zeming Lin, Xiamen (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/820,112

(22) Filed: Mar. 16, 2020

(65) Prior Publication Data
US 2020/0219676 A1 Jul. 9, 2020

Related U.S. Application Data

(63) Continuation of application No. PCT/CN2018/105823, filed on Sep. 14, 2018.

(30) Foreign Application Priority Data

Sep. 15, 2017 (CN) .......................... 201710840492.9

(51) Int. Cl.
*H01H 7/08* (2006.01)
*H01H 3/42* (2006.01)

(52) U.S. Cl.
CPC ................ *H01H 7/08* (2013.01); *H01H 3/42* (2013.01)

(58) Field of Classification Search
CPC ............. H01H 15/04; H01H 7/08; H01H 3/42
USPC ....................................... 200/33 R; 218/154
See application file for complete search history.

(56) References Cited

U.S. PATENT DOCUMENTS

| 4,578,551 A * | 3/1986 | Lin ...................... H01H 3/3042 |
| | | 185/37 |
| 2010/0089875 A1* | 4/2010 | Treier .................. H01H 31/003 |
| | | 218/154 |

FOREIGN PATENT DOCUMENTS

| CN | 101728096 A | 6/2010 |
| CN | 105453209 A | 3/2016 |
| JP | S51150076 A | 12/1976 |
| KR | 101232985 B1 | 2/2013 |

OTHER PUBLICATIONS

State Intellectual Property Office of the P.R. China, International Search Report & Written Opinion issued in corresponding Application No. PCT/CN2018/105823, dated Nov. 15, 2018, 10 pp.
European Extended Search Report issued for EP Application No. 18856816.6 dated May 10, 2021.

\* cited by examiner

*Primary Examiner* — Edwin A. Leon
*Assistant Examiner* — Iman Malakooti
(74) *Attorney, Agent, or Firm* — Greenberg Traurig, LLP

(57) ABSTRACT

Implementations of the subject matter described herein provide a slowing mechanism for a switching apparatus and a switching apparatus. The slowing mechanism includes: a shaft adapted to be rotatable in response to an operation of an actuator to drive a moving element of the switching apparatus; at least one slowing wheel fixed on the shaft and having a slowing contour; and a movable rocker engaging with the slowing wheel. The slowing wheel is adapted to cause the rocker to move abutting against the slowing contour on the slowing wheel in response to the rotation of the shaft, so as to slow down the rotation of the shaft. The slowing mechanism can slow down the operation of the moving element of a switching apparatus, while not impacting the switching performance and life time of the switching apparatus.

15 Claims, 4 Drawing Sheets

SLOWING MECHANISM FOR SWITCHING APPARATUS AND SWITCHING APPARATUS

CROSS-REFERENCE TO RELATED APPLICATIONS

The present disclosure claims priority to the Chinese patent application No. 201710840492.9 filed on Sep. 15, 2017, the entire disclosure of which is hereby incorporated by reference in its entirety.

BACKGROUND

Electrical automatic transfer switch is commonly used in power distribution system for detecting and monitoring the power quality and transferring supply between normal power source and standby power source. Depending on the application scenarios, dual-power source automatic transfer switch is generally divided into two categories, that is, the two-working position switch (or briefly called two-position switch) and the three-working position switch (or briefly called three-position switch). For the three-position switch, the contact can stop at an off position where no connection is established with any power source. For two-position switch, the contact only transits between two power sources with no stop.

For the two-position switch, if the contact of the switch transfers too fast between the two positions, the contact may touch another power source before the arc between the contact and the previous power source has been extinguished, causing a short circuit between the two power sources which is a serious and unacceptable fault.

The early automatic transfer switch is composed of two separate electrical switches and a connection with a set of mechanical or electrical interlocking device, and the transfer time for transferring the switch can be extended by controlling the time delay between operating the two separate electrical switches with the interlocking device, so as to avoid the short circuit between the two powers sources.

One-piece automatic transfer switch has only one set of action mechanism for transferring between two power sources which acts quickly. The one-piece automatic transfer switch comprises a semi-independent type which drives the contact to move during transferring the switch with electrical force and manual force directly, and an independent type which drives the contract to move during transferring the switch with a force from a main spring charged by electrical force or manual force. For the semi-independent type of transfer switch, it is easy to extend the transfer time by controlling the time for applying the electrical force and the speed for applying the manual force to avoid the short circuit between the two powers sources. For the independent type of transfer switch, particularly for the two-position switch, the known way to extend the transfer time is to reduce the force applying to the operation mechanism. However, reducing the force applying to the operation mechanism may induce the negative affect of reducing the speed of opening and closing the contact, which will significantly deteriorate the performance and life time of the transfer switch.

SUMMARY

Hence, in order to overcome one or more of the deficiencies in the prior art mentioned above, one of objectives of embodiments of the present disclosure is to provide a slowing mechanism for a switching apparatus and a switching apparatus.

In one aspect of the embodiments of the present disclosure, there is provided a slowing mechanism for a switching apparatus. The slowing mechanism comprises: a shaft adapted to be rotatable in response to an operation of an actuator to drive a moving element of the switching apparatus; at least one slowing wheel fixed on the shaft and having a slowing contour; and a movable rocker engaging with the slowing wheel. The slowing wheel is adapted to cause the rocker to move abutting against the slowing contour on the slowing wheel in response to the rotation of the shaft, so as to slow down the rotation of the shaft.

In some embodiments of the present disclosure, the slowing wheel comprises a slot, and the slowing contour is provided in the slot, and the rocker comprises a pin adapted to slide in the slot and engage with the slowing contour.

In some embodiments of the present disclosure, the slowing contour comprises at least one protrusion on a first side of the slot and at least one recess on an opposite second side of the slot, and the protrusion faces towards the recess.

In some embodiments of the present disclosure, the slot is a circular slot, the center of the circular slot being on an axis of the shaft.

In some embodiments of the present disclosure, the circular slot comprises a first end and an opposite second end along the circumference of the circular slot, and the slowing contour is provided in a middle position between the first end and the second end, or, adjacent to one of the first end and the second end.

In some embodiments of the present disclosure, the protrusion comprises two drive surfaces adapted to apply a force on the pin to move the rocker in a first moving direction in response to the rotation of the shaft in two opposite rotation directions.

In some embodiments of the present disclosure, the recess comprises two drive surfaces adapted to apply a force on the pin to move the rocker in a second moving direction opposite to the first moving direction in response to the rotation of the shaft in two opposite rotation directions.

In some embodiments of the present disclosure, the protrusion is adapted to push the pin into the respective recess facing towards the protrusion, and the recess is adapted to push the pin back into the slot.

In some embodiments of the present disclosure, the rocker is pivotable around a pivot which is away from the pin, or linearly movable.

In some embodiments of the present disclosure, the slowing mechanism further comprises a damping device for providing resistance against the movement of the rocker.

In some embodiments of the present disclosure, the rocker comprises a counterweight.

In some embodiments of the present disclosure, the slowing mechanism further comprises a stroke controller coupled between the shaft and the slowing wheel and adapted to change an angle of rotation of the slowing wheel as compared to an angle of the rotation of the shaft.

In some embodiments of the present disclosure, the stroke controller comprises at least one of the followings: a reduction gear, a linkage and a Geneva wheel.

In some embodiments of the present disclosure, the least one slowing wheel comprises a plurality of slowing wheels fixed on the shaft, and each of the plurality of slowing wheels is coupled to a separate rocker.

In another aspect of the embodiments of the present disclosure, there is provided a switching apparatus. The switching apparatus comprises at least one slowing mechanism according to any of the embodiments of the present disclosure.

In some embodiments of the present disclosure, the switching apparatus further comprises a moving contact which is coupled to the shaft.

In some embodiments of the present disclosure, the at least one slowing mechanism comprises a first slowing mechanism and a second slowing mechanism. The switching apparatus further comprises: a first moving contact coupled to the shaft of the first slowing mechanism and adapted to connect and disconnect a first power supply; and a second moving contact coupled to the shaft of the second slowing mechanism and adapted to connect and disconnect a second power supply.

In some embodiments of the present disclosure, the switching apparatus is a dual power supply automatic transfer switch.

In the slowing mechanism of various embodiments of the present disclosure, by providing a slowing contour on the rotation path of the shaft coupled to the moving element of a switching apparatus, the movement of the moving element between two operation positions can be slowed down, such that the transfer time of the switching apparatus can be extended without the need of a human interposing, which is advantageous in avoiding short circuit fault in the switching apparatus during the switching operation.

Meanwhile, the position and number of the slowing contour can be easily arranged specifically for different switching apparatus to meet different requirements on the amount, the start time and the end time of the delay duration. By arranging the slowing contour properly, the slowing mechanism may also realize the effect of delaying the transfer time of the switching apparatus, while will not reduce the breaking speed and the closing speed of the moving element. As such, the switching performance of the switching apparatus is also ensured.

BRIEF DESCRIPTION OF THE DRAWINGS

The above and other objectives, features and advantages of the subject matter described herein will become more apparent through more detailed depiction of example implementations of the subject matter described herein in conjunction with the accompanying drawings, wherein in the example implementations of the subject matter described herein, same reference numerals usually represent same components.

Throughout the drawings, the same or similar reference symbols are used to indicate the same or similar elements.

DETAILED DESCRIPTION

The subject matter described herein will now be discussed with reference to several example implementations. It should be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below. A definition of a term is consistent throughout the description unless the context clearly indicates otherwise.

Figure 1:
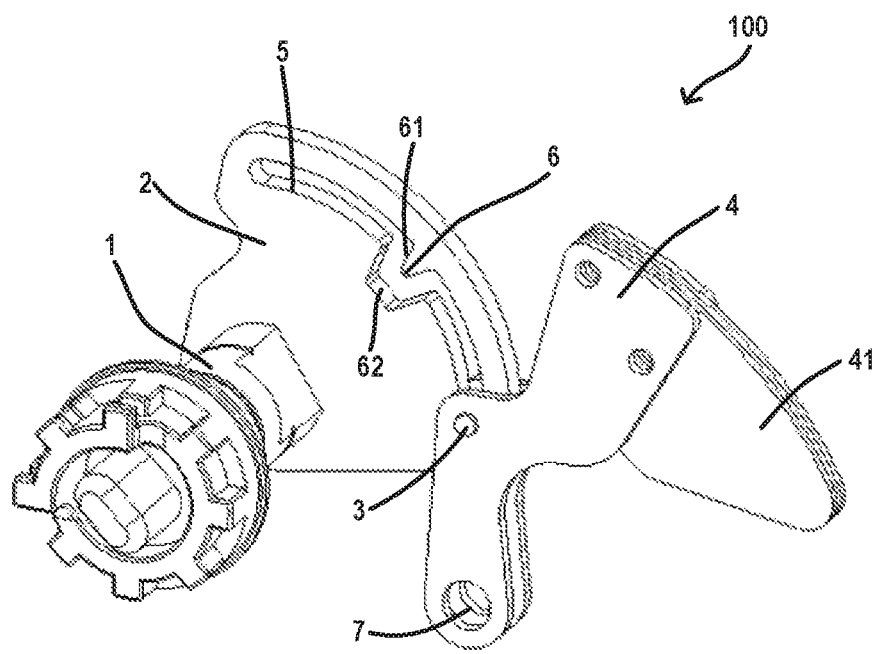
FIG. 1 is a perspective view of a slowing mechanism for a switching apparatus according to an embodiment of the present disclosure.

FIG. 1 is a perspective view of a slowing mechanism 100 for a switching apparatus according to an embodiment of the present disclosure. As shown, the slowing mechanism 100 comprises a shaft 1 which is configured to be rotatable in response to the driving of an actuator to drive a moving element of a switching apparatus. The moving element of the switching apparatus may be coupled to the shaft 1 directly or via a transmission means, such that it can be operated to switch between two operating positions in response to the rotation of the shaft 1 in two rotating directions opposite to each other so as to achieve the function of the switching apparatus.

A slowing wheel 2 is fixed on the shaft 1, such that it can rotate along with the shaft 1. A slot 5 is provided on the slowing wheel 2, with a slowing contour 6 in the slot 5. The slowing contour 6 comprises one protrusion 61 on one side of the slot 5 and one recess 62 on the opposite side of the slot 5, and the protrusion 61 faces towards the recess 62.

Figure 3:
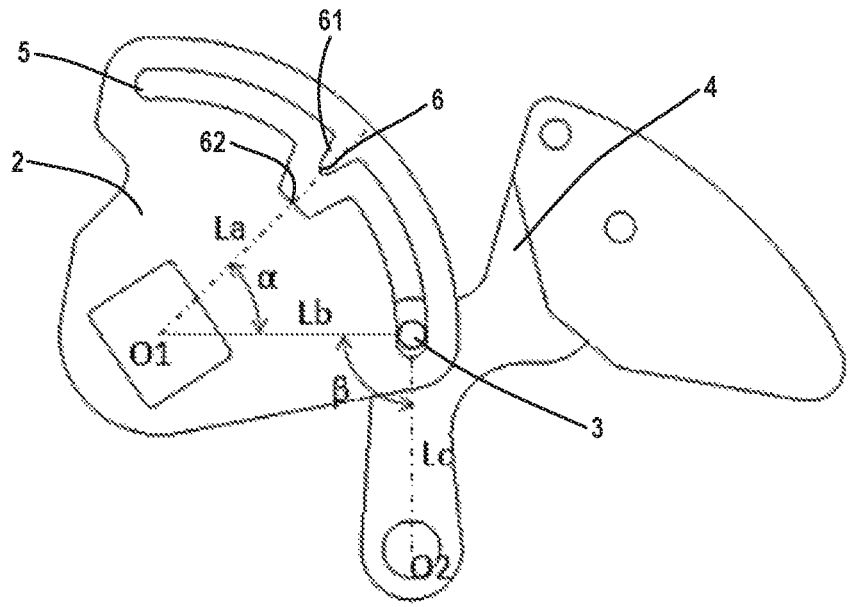
FIG. 3 shows the slowing mechanism of FIG. 1 in a first state.

A rocker 4 is further provided which is pivotable around a pivot 7. A pin 3 is provided on the rocker 4 away from the pivot 7. The pin 3 is received in the slot 5 of the slowing wheel 2 and can slide along the slot 5. A counterweight 41 may be provided on the rocker 4 to increase the weight of the rocker 4. As shown in FIG. 3, In one embodiment, the line Lb connecting the axis O1 of the shaft 1 and the center of the pin 3 is perpendicular to the line Lc connecting the center of the pin 3 and the pivot center O2 of the rocker 4 (i.e. the angle β is 90 degree), but this is not necessary. The angle β may also larger or smaller than 90 degree.

As the shaft 1 rotates, the slot 5 on the slowing wheel 2 rotates around the axis O1 of the shaft 1. During the rotation of the slot 5, the pin 3 received in the slot 5 will be forced to follow the contour of the slot 5 until it meets the slowing contour 6.

In one embodiment, the slot 5 may be a circular slot 5 with the center of it being on the axis O1 of the shaft 1, such that the trajectory of rotation of the circular slot 5 will conform to the contour of the circular slot 5. As a result, during the rotation of the slowing wheel 2, the pin 3 will not suffer a force from the slowing wheel 2 to drive the rocker 4 to pivot around the pivot center O2, as long as the pin 3 remains engaging with the circular section of the slot 5. This is particular advantageous for the application where no speed reduction is desired during the start or the end of the rotation of the shaft 1, as the slowing wheel 2 will not suffer a counter force from the pin 3 to slow down during the rotation of the slowing wheel 2 while the pin 3 is engaging with the circular section of the slot 5 until the pin 3 meets the slowing contour 6.

In one embodiment, the circular slot 5 comprises a first end and a second end along the circumference of the circular slot 5, and the slowing contour 6 is provided in the middle position between the first end and the second end. With this arrangement of the slot 5, the rotation of the slow wheel 2 and the shaft 1 will not be slowed down at the start and the end of the rotation either in clockwise or in counter-clockwise direction. This is advantageous for the switching apparatus having a moving element (for example, a moving contact) which needs to take a fast bi-directional action at two operation positions.

Figure 2:
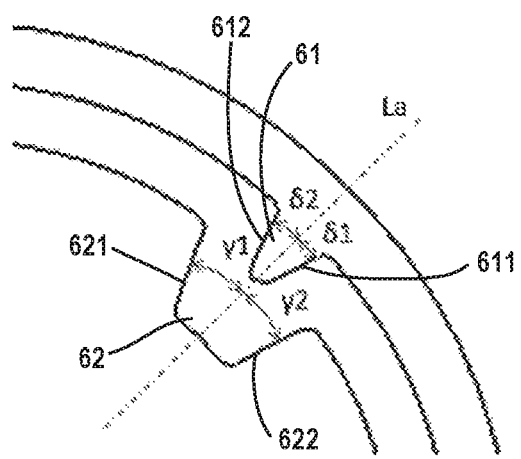
FIG. 2 is an enlarged view of the slowing feature in the slowing mechanism of FIG. 1.

As shown in FIG. 1-FIG. 2, in one embodiment, the slowing contour 6 comprises a protrusion 61 on the outer side of the slot 5 and a recess 62 on the opposite inner side of the slot 5. However, the positions of the protrusion 61 and the recess 62 can be exchanged. A line La connecting the axis O1 and the vertex of the protrusion 61 divides the protrusion 61 and the recess 62 into two sides. The protrusion 61 has two drive surfaces 611 and 612 on the two sides respectively, and the recess 62 also has two drive surfaces 621 and 622 on the two sides respectively. Each of the drive surfaces 611, 612 on the protrusion 61 is configured to apply to the pin 3 a force component in a moving direction of the pin 3 towards the axis O1 (corresponding to the counter-clockwise direction of the rocker 4) in response to the rotation of the shaft 1 in the two rotation directions opposite to each other, and each of the drive surfaces 621, 622 on the recess 62 is configured to apply to the pin 3 a force component in a moving direction of the pin 3 away from the axis O1 (corresponding to the clockwise direction of the rocker 4) in response to the rotation of the shaft 1 in the two rotation directions opposite to each other.

Figure 4:
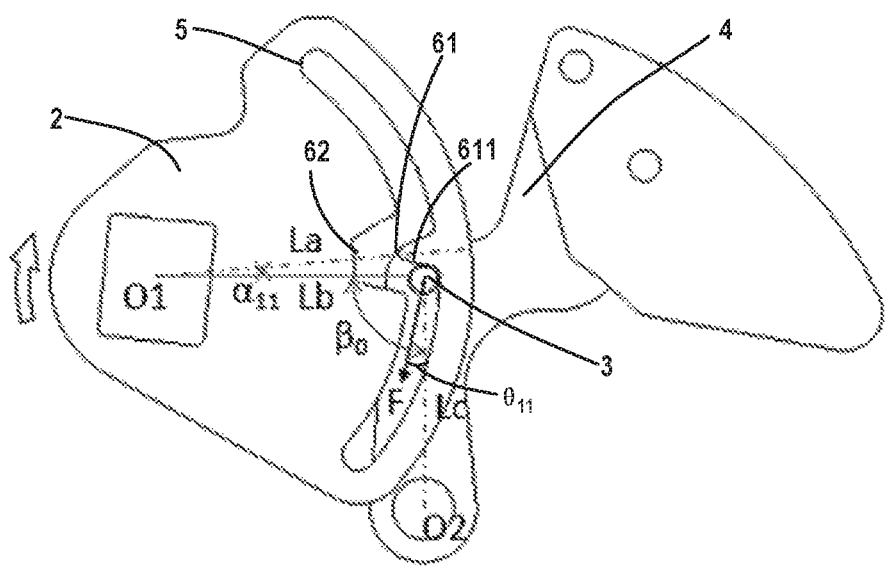
FIG. 4 shows the slowing mechanism of FIG. 1 in a second state.

To this end, the inclined angles $\theta_1$, $\theta_2$, $\gamma_1$, $\gamma_2$ of the drive surfaces 611, 612, 621, 622 relative to the line La as shown in FIG. 2 need to be designed properly. With reference to FIG. 4, when the slowing wheel 2 rotates clockwise to the position where the drive surface 611 on the protrusion 61 just abuts against the pin 3, the drive surface 611 will apply a force F on the pin 3 in the normal direction of the contact point therebetween. The angle $\theta_{11}$ between the direction of the force F and the line Lc connecting the center of the pin 3 and the pivot center O2 of the rocker 4 can be calculated from the equation:

$$\theta_{11}=\delta_0-90°+\delta_1-\alpha_{11} \quad \text{(Equation 1)}$$

where $\alpha_{11}$ represents the angle between the line La and the line Lb when the drive surface 611 contacts the pin 3, and $\delta_0$ represents the angle between the line Lb and the line Lc when the drive surface 611 contacts the pin 3. The value of the angle $\theta_{11}$ should be ensured to be larger than zero, such that the force F may generate a component perpendicular to the line Lc and thereby generate a torque in the counter-clockwise direction to rotate the rocker 4 around the pivot center O2. As a result, the pin 3 may move over the drive surface 611 and into the recess 62, and will not block the continuous rotation of the slowing wheel 2. At the mean time, the value of the angle $\theta_{11}$ determines the slowing effect to the slowing wheel 2. The larger the angle $\theta_{11}$ is, the larger the component perpendicular to the line Lc will be and the time for the pin 3 to move over the drive surface 611 will be shorter, which means that the slowing effect to the slowing wheel 2 will be weaker.

The time for the pin 3 to move over the drive surface 611 further depends on the weight of the rocker 4, the length and contour of the drive surface 611, the distance from the center of the pin 3 to the pivot center O2, and the distance from the protrusion 61 to the axis O1 of the shaft 1. By taking all these factors into consideration, a desired time for the pin 3 to move over the drive surface 611 can be obtained and thus the desired slowing effect of the drive surface 611 can be realized.

Figure 5:
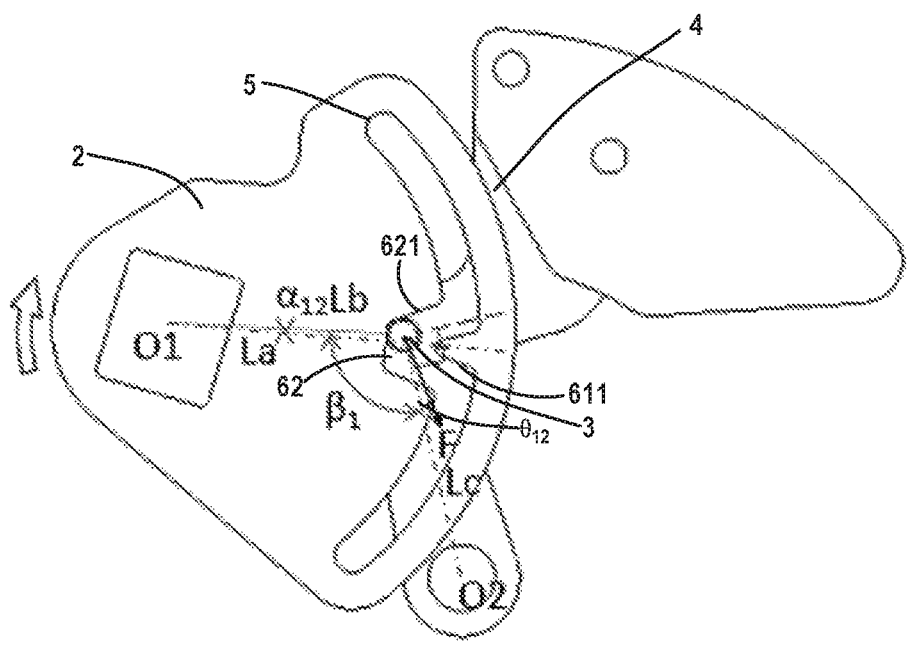
FIG. 5 shows the slowing mechanism of FIG. 1 in a third state.

With reference to FIG. 5, as the slowing wheel 2 continues to rotate clockwise, after leaving the drive surface 611, the pin 3 will come into the recess 62 to abut against the drive surface 621. The drive surface 621 will also apply a force F on the pin 3 in the normal direction of the contact point therebetween. The angle $\theta_{12}$ between the direction of the force F and the line Lc can be calculated from the equation:

$$\theta_{12}=90°-\delta_1+\gamma_1-\alpha_{12} \quad \text{(Equation 2)}$$

where $\alpha_{12}$ represents the angle between the line La and the line Lb when the drive surface 621 contacts the pin 3, and $\beta_1$ represents the angle between the line Lb and the line Lc when the drive surface 621 contacts the pin 3. The value of the angle $\theta_{12}$ should be ensured to be larger than zero to generate a component perpendicular to the line Lc and thereby generate a torque in the clockwise direction to rotate the rocker 4 around the pivot center O2. As a result, the pin 3 may move over the drive surface 621 and into the circular slot 5 again, and will not block the continuous rotation of the slowing wheel 2. At the meantime, the value of the angle $\theta_{12}$ determines the slowing effect to the slowing wheel 2. The larger the angle $\theta_{12}$ is, the larger the component perpendicular to the line Lc will be and the time for the pin 3 to move over the drive surface 621 will be shorter, which means that the slowing effect to the slowing wheel 2 will be weaker. The slowing effect of the drive surface 621 also depends on the other factors as discussed above with respect to the drive surface 611.

Figure 7:
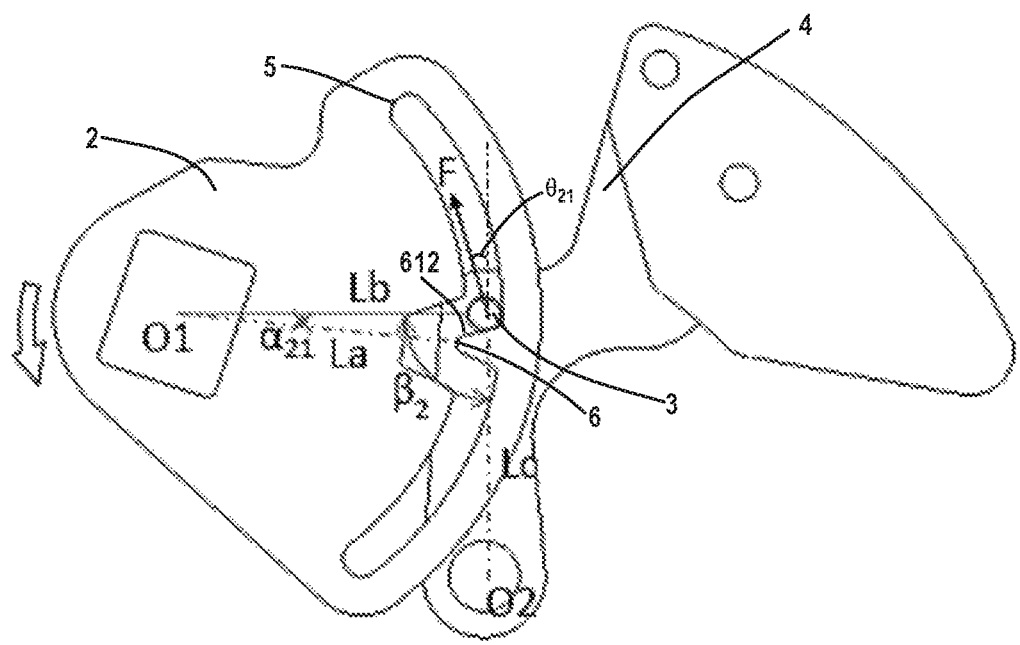
FIG. 7 shows the slowing mechanism of FIG. 1 in a fifth state.
Figure 8:
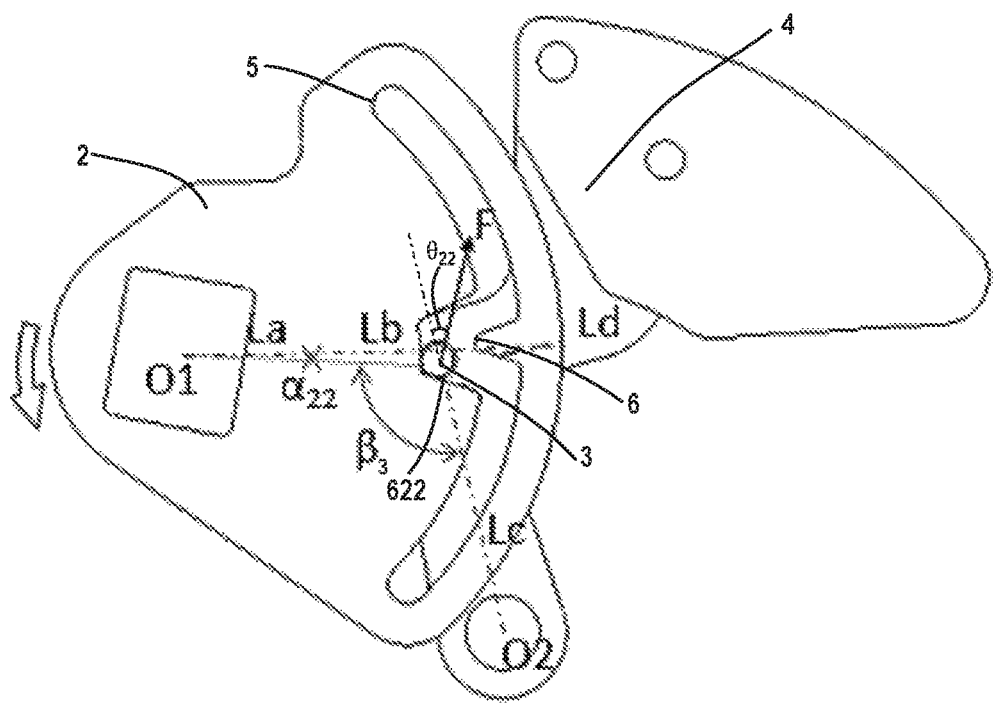
FIG. 8 shows the slowing mechanism of FIG. 1 in a sixth state.

Likewise, with reference to FIG. 7 and FIG. 8, the drive surface 612 on the other side of the protrusion 61 and the drive surface 622 on the other side of the recess 62 can also be designed similar to the drive surface 611 and the drive surface 621 respectively as discussed above, to realize the slowing effect to the slowing wheel 2. When the slowing wheel 2 rotates counter-clockwise to make the drive surface 612 begin to contact the pin 3, the angle $\theta_{21}$ between the direction of the force F applied by the drive surface 612 on the pin 3 and the line Lc can be calculated from the equation:

$$\theta_{21}=\beta_2-90°+\delta_2-\alpha_{21} \quad \text{(Equation 3)}$$

where $\alpha_{21}$ represents the angle between the line La and the line Lb when the drive surface 612 contacts the pin 3, and $\beta_2$ represents the angle between the line Lb and the line Lc when the drive surface 612 contacts the pin 3 (see FIG. 7). The value of the angle $\theta_{21}$ should be ensured to be larger than zero to generate a component perpendicular to the line Lc and thereby generate a torque in the counter-clockwise direction to rotate the rocker 4 around the pivot center O2.

With reference to FIG. 8, as the slowing wheel 2 continues to rotate counter-clockwise, after leaving the drive surface 612, the pin 3 will come into the recess 62 to abut against the drive surface 622. The angle $\theta_{22}$ between the direction of the force F and the line Lc can be calculated from the equation:

$$\theta_{22}=90°-\beta_3+\gamma_2-\alpha_{22} \quad \text{(Equation 4)}$$

where $\alpha_{22}$ represents the angle between the line La and the line Lb when the drive surface 622 contacts the pin 3, and $\beta_3$ represents the angle between the line Lb and the line Lc when the drive surface 622 contacts the pin 3. The value of the angle $\theta_{22}$ should be ensured to be larger than zero to generate a component perpendicular to the line Lc and thereby generate a torque in the clockwise direction to rotate the rocker 4 around the pivot center O2.

During the pin 3 is moving over the drive surface 612 and the drive surface 622, the slowing wheel 2 is also slowed down.

Each of the drive surfaces 611, 612, 621, 622 is shown as a general flat surface along the moving path of the pin 3. In this case, since the angle $\alpha$ between the line La and the line Lb and the angle $\beta$ between the line Lb and the line Lc always change during the pin 3 is moving along the drive surfaces, the angle $\theta$ between the force F and the line Lc will always change accordingly. As a result, the component of the force F perpendicular to the line Lc will change which further results in the rate of slowing down the slowing wheel 2 to be changed as the pin 3 is moving over the drive surface. In order to reduce the change of the rate of slowing down the slowing wheel 2 so as to obtain a more smooth slowing effect, the drive surfaces may be formed in a curved shape to compensate for the change of the angle $\theta$ due to the rotation of the slowing wheel 2 and the rocker 4. It is appreciated that the drive surfaces 611, 612, 621, 622 may also be formed in any possible shape to achieve a particular profile of the slowing rate.

Although only one protrusion 61 and one corresponding recess 62 are described above and shown in the figures, it is appreciated that more than one protrusion 61 and corresponding recess 62 as described above may be provided in the slot 5 along the extension of the slot 5. By arranging multiple protrusions 61 and corresponding recesses 62 in the slot 5, the slowing wheel 2 can be slowed down multiple times by the pin 3 moving over the multiple protrusions 61 and recesses 62 during the rotation of the slowing wheel 2. As such, a better slowing effect for the shaft 1 can be achieved.

In the above embodiment, the slowing contour 6 is shown to be provided in the middle position between the first end and the second end of the slot 5. However, it is appreciated that the slowing contour 6 may be provided on any position of the slot 5 along the extension of the slot 5, as long as it provides the slowing effect to the shaft 1 at a proper time slot during the rotation of the shaft 1 depending on the specific requirement for the operation of the moving element of the switching apparatus coupled to the shaft 1. For example, for the switching apparatus in which the moving element only needs to contact and disconnect one stationary contact, the shaft 1 coupled to such moving element only needs to rotate at a high speed in an angular range close to one rotation limit position of the shaft 1 to realize a fast contact or disconnect between the moving element and the stationary contact. In this case, the slowing contour 6 may be arranged adjacent to one end of the slot 5 corresponding to the other rotation limit position of the shaft 1 to slow down the shaft 1 when the shaft 1 has rotated to be close to the other rotation limit position. More than one slowing contour 6 may also be arranged along the extension of the slot 5 from any position between the two ends of the slot 5 to one end of the slot 5, or even can be arranged along the whole extension of the slot 5.

Although the rocker 4 is described above and shown in the figures as pivotable around a pivot, it is appreciated that the rocker 4 may also be linearly movable. The linear moving direction of such rocker 4 can be generally towards and away from the axis of the shaft 1, such that the rocker 4 can also smoothly move over the protrusion 61 and the recess 62 while also providing resistance to the slowing wheel 2 to slow down the shaft 1.

In one embodiment, more than one slowing wheel 2 can be fixed in parallel on the shaft 1. Each slowing wheel is coupled to a separate rocker 4. In this case, during the rotation of the shaft 1, the shaft 1 will bear the resistance from each of the multiple rockers 4, such that the slowing effect to the shaft 1 can be improved.

In one embodiment, a damping device (not shown) can be provided for providing resistance against the movement of the rocker 4. For example, a coil spring or a friction element may be arranged on the pivot of the rocker 4 to apply resistance against the rotation of the rocker 4 in either direction. With the increased resistance from the damping device, the counter force applied on the slowing wheel 2 is further increased. As a result, the slowing effect to the shaft 1 can be further improved.

In one embodiment, a stroke controller (not shown) may be coupled between the shaft 1 and the slowing wheel 2. Via the stroke controller, the stroke (i.e. the rotating angle) of the shaft 1 during the operation can be amplified into a relative large stroke (i.e. the rotating angle) of the slowing wheel 2. As such, longer extension of the slot 5 on the slowing wheel 2 can be provided and more slowing contours 6 can be arrange in the slot 5 to be engaged with the pin 3 as the slowing wheel 2 rotates over a larger angle.

As a result, the slowing effect to the shaft 1 and the moving element coupled to the shaft 1 can be improved. Moreover, the amplification to the stroke by the stroke controller may also result in the reduction of the force received by the slowing wheel 2 as compared to the force applied on the shaft 1 from the actuator. As such, less force is provided for the slowing wheel 2 to counteract the resistance from the rocker 4, causing a further improved slowing effect to the shaft 1. This stroke controller is particularly advantageous for the switching apparatus in which the moving element and the shaft 1 has a limited stroke, as such shaft 1 may not provide sufficient stroke for the slowing wheel 2 to allow the pin 3 to engage with the slowing contour 6 unless amplifying the stroke by the stroke controller. The stroke controller can be embodied by a known mechanism. For example, the stroke controller may be a reduction gear, a linkage, a Geneva wheel or a combination thereof.

In one embodiment, the stroke controller can also be mounted between the shaft 1 and the slowing wheel 2 in a reversed manner such that the stroke controller will reduce the rotation angle of the slowing wheel 2 as compared to the rotation angle of the shaft 1. This is advantageous for providing the slowing mechanism for a moving element which needs to be driven by rotation of more than 360 degree of a drive shaft during switching operation.

With reference to FIGS. 3-8, the operation of the slowing mechanism for a switching apparatus according to an embodiment of the present disclosure will be described in connection with a switching apparatus. The switching apparatus is exemplified as a dual power supply automatic transfer switch for switching between a first power supply and a second power supply. However, it is appreciated that the slowing mechanism for a switching apparatus according to any embodiment of the present disclosure may also be used in other types of switching apparatus which also need to slow down the operation of a moving element.

The dual power supply automatic transfer switch comprises a moving contact acting as the moving element of the transfer switch. The dual power supply automatic transfer switch further comprises a slowing mechanism of the present disclosure as shown in the figures. The moving contact is coupled to the shaft 1 of the slowing mechanism and is driven by the shaft 1. The shaft 1 is further coupled to an actuator and is driven by the actuator.

In the first state, the shaft 1 is in the first rotation limit position in which the moving contact of the transfer switch coupled to the shaft 1 is just in the position connecting the first power supply while disconnecting the second power supply. In this state, referring to FIG. 3, the pin 3 on the rocker 4 engages with the slot 5 on the slowing wheel 2 just at or close to the first end of the slot 5.

In response to a triggering event, for example, a breakdown of the first power supply, the actuator of the transfer switch automatically drives the shaft 1 to rotate clockwise, so as to drive the moving contact to be opened from the first power supply. During the initial period of the rotation of the shaft 1, the slot 5 on the slowing wheel 2 rotates clockwise together with the shaft 1 and create a relative movement of the pin 3 engaged with the slot 5 relative to the slot 5. Since the slot 5 has a circular extension with the center on the axis of the shaft 1, the trajectory of the slot 5 conforms to the extension of the slot 5, such that the pin 3 will not receive a force from the side of the slot 5 and will stand still. As a result, the slowing wheel 2 will not bear a resistance from the rocker 4 and the rotation of the shaft 1 will not be slowed down by the rocker 4. As a result, the shaft 1 can drive the moving contact to move with a relative high speed to be opened from the first power supply. The fast moving of the moving contact at the beginning of the opening operation is desired and advantageous because it reduces the period for burning the contacts of the transfer switch by the arc and improves the operation performance and life time of the transfer switch. Due to the shape of the slot 5, the slowing mechanism will not impact the performance of the transfer switch at the beginning of the operation of the moving contact.

With reference to FIG. 4, as the slowing wheel 2 continues to rotate clockwise, the pin 3 on the rocker 4 begins to contact the first drive surface 611 of the protrusion 61. The first drive surface 611 applies a force F on the pin 3, which force F will generate a component perpendicular to the line Lc connecting the center of the pin 3 and the pivot center O2 of the rocker 4. Such component generates a torque on the rocker 4 to push the rocker 4 to pivot counter-clockwise. The relative small component of the force F due to the small angle $\theta_{11}$ and the relative large weight of the rocker 4 due to the counterweight 41 cause a relative slow speed of the movement of the rocker 4. The slowing wheel 2 has to be slowed down due to the slow movement of the pin 3 along the drive surface 611.

With reference to FIG. 5, after moving over the drive surface 611, the pin 3 comes into the recess 62 facing towards the protrusion 61. In another word, the protrusion 61 pushes the pin 3 into the recess 62 facing towards the protrusion 61. The continuous rotation of the slowing wheel 2 will cause the drive surface 621 on one side of the recess 62 to contact the pin 3, and to apply a force F on the pin 3. The relative small component of the force F perpendicular to the line Lc due to the small angle $\theta_{12}$ and the relative large weight of the rocker 4 due to the counterweight 41 cause a relative slow speed of the movement of the rocker 4 in the clockwise direction. The slowing wheel 2 continues to be slowed down due to the slow movement of the pin 3 along the drive surface 621.

During the slow movement of the pin 3 over the drive surfaces 611 and 621, the slowing wheel 2 and the shaft 1 are slowed down before the shaft 1 rotates to a second rotation limit position, without the need of the interposing of a human operation. As such, there is a sufficient time period for the arc between the stationary contact connected to the first power supply and the moving contact to be completely extinguished before the moving contact contacts the stationary contact connected to the second power supply. As a result, the possibility of a short circuit between the first and the second power supply due to the arc can be significantly reduced.

Figure 6:
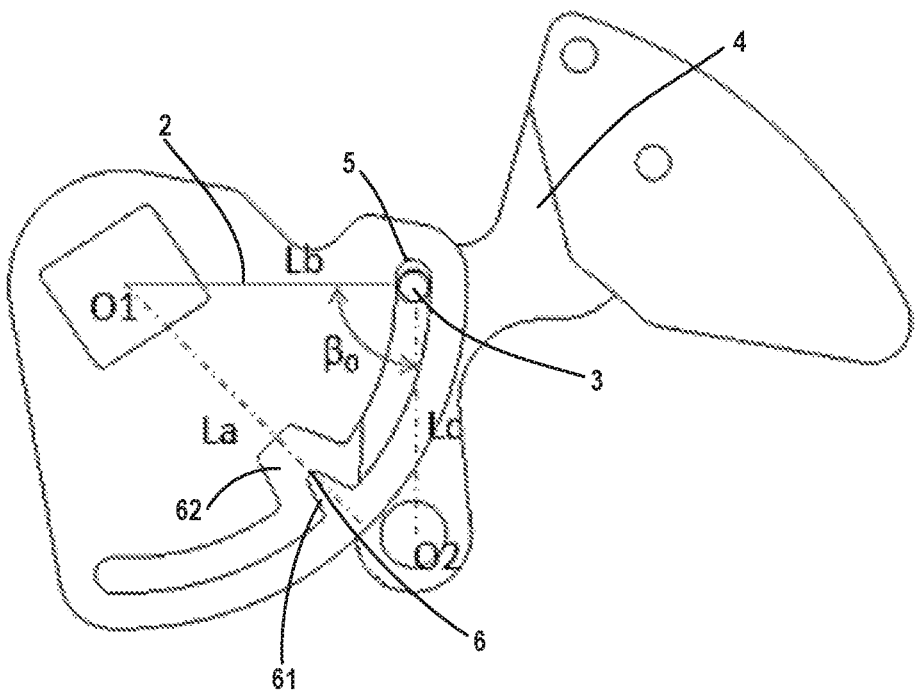
FIG. 6 shows the slowing mechanism of FIG. 1 in a fourth state.

With reference to FIG. 6, after moving over the drive surface 621, the pin 3 comes out of the recess 62 and be pushed back into the circular slot 5 by the recess 62. Due to the circular extension of the slot 5, the continuous rotation of the slowing wheel 2 in the clockwise direction will not drive the pin 3 to move, and the slowing wheel 2 and the shaft 1 will not be slowed down by the rocker 4 until the shaft 1 reaches the second rotation limit position or the pin 3 contacts the second end of the slot 5. In this state, the moving contact has contacted the stationary contact of the second power supply, such that the transfer switch finishes the switching operation from the first power supply to the second power supply. Since the slowing wheel 2 is not slowed down during the rotation of the slowing wheel 2 after the pin 3 has left the recess 62, the moving contact coupled to the shaft 1 can contact the second power supply with a high speed. This is also desired and advantageous as the fast closing of the moving contact also results in improved operation performance and life time of the transfer switch. As a result, due to the shape of the slot 5, the slowing mechanism will also not impact the performance of the transfer switch at the end of the operation of the moving contact.

In the case that the switch is to be switched from the second power supply back to the first power supply, the actuator will rotates the shaft 1 in a different direction (i.e., the counter clockwise direction in the figures). As shown in FIG. 7, at the beginning of the counter clockwise rotation of the slowing wheel 2, the slowing wheel 2 will not be slowed down by the rocker 4 until the pin 3 contacts the drive surface 612 on the opposite side of the protrusion 61. As a result, the shaft 1 can also drive the moving contact to move with a relative high speed to be opened from the second power supply.

With reference to FIG. 7 and FIG. 8, after the pin 3 contacts the drive surface 612, the drive surface 612 will also apply a force F on the pin 3 to move the rocker 4 and push the pin 3 into the recess 62, such that the slowing wheel 2 and the shaft 1 are slowed down by the rocker 4. The continuous rotation of the slowing wheel 2 in the counter clockwise direction causes the pin 3 to contact the drive surface 622 on the other side of the recess 62. After the pin 3 contacts the drive surface 622, the drive surface 622 will also apply a force F on the pin 3 to move the rocker 4 and push the pin 3 out of the recess 62 and back into the circular slot 5, such that the slowing wheel 2 and the shaft 1 are further slowed down by the rocker 4. As a result, there is also a sufficient time period for the arc between the stationary contact connected to the second power supply and the moving contact to be completely extinguished before the moving contact contacts the stationary contact connected to the first power supply. As a result, a short circuit between the first and the second power supply due to the arc can also be avoided.

After moving over the drive surface 622, the continuous rotation of the slowing wheel 2 in the counter clockwise direction will not drive the pin 3 to move, and the slowing wheel 2 and the shaft 1 will not be slowed down by the rocker 4 until the shaft 1 reaches the first rotation limit position or the pin 3 contacts the first end of the slot 5. In this state, the moving contact has contacted the stationary contact of the first power supply, such that the transfer switch finishes the switching operation from the second power supply to the first power supply. Since the slowing wheel 2 is not slowed down during the rotation of the slowing wheel 2 after the pin 3 has left the recess 62, the moving contact coupled to the shaft 1 can contact the first power supply with a high speed.

Although a switching apparatus is described above which comprises only one slowing mechanism of the present disclosure, it is appreciated that more than one such slowing mechanism can be applied in a switching apparatus. In one embodiment, a switching apparatus may comprises a first moving contact accounting for connecting and disconnecting a first power supply, and a second moving contact accounting for connecting and disconnecting a second power supply.

In such an embodiment, the switching apparatus may comprise a first slowing mechanism and a second slowing mechanism according to the embodiments of the present disclosure. The first moving contact is coupled to the shaft 1 of the first slowing mechanism, and the second moving contact is coupled to the shaft 1 of the second slowing mechanism. The two shafts 1 are driven such that the first moving contact and the second moving contact can close and open alternately so as to switch between the first power supply and the second power supply. In this embodiment, the first slowing mechanism is used to only slow down the operation of the first moving contact, and the second slowing mechanism is used to only slow down the operation of the second moving contact.

Since the first moving contact and the second moving contact respectively account for connecting and disconnecting only one power supply at one limit operation position of the moving contact, fast movement of the moving contact at another limit operation position is not needed. In this case, the slowing contour 6 in the first and second slowing mechanism can extend in the slot 5 to one end of the slot 5 corresponding to the open position of the moving contact, such that the slowing effect for the first contact and the second contact can be improved.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

By studying the drawings, the disclosure of the embodiments of the present disclosure, and the mounted Claims, those skilled in the art may understand and implement other modifications of the disclosed embodiments during the implementation of the present disclosure. In the claims, "comprising" does not exclude other elements or steps, and "a" or "one" does not exclude the plural concept. The simple fact of illustrating specific elements in the dependent claims, which are mutually different from each other, does not indicate that the combination of these elements cannot be used advantageously. The labels in drawings of the claims should not be interpreted as limiting the scopes thereof.

Though the present disclosure has been described with reference to the currently considered embodiments, it should be appreciated that the present disclosure is not limited the disclosed embodiments. On the contrary, the present disclosure is intended to cover various modifications and equivalent arrangements falling within in the spirit and scope of the appended claims. The scope of the appended claims is accorded with broadest explanations and covers all such modifications and equivalent structures and functions.

What is claimed is:

1. A slowing mechanism for a switching apparatus, comprising:
   a shaft adapted to be rotatable in response to an operation of an actuator to drive a moving element of the switching apparatus;
   at least one slowing wheel fixed on the shaft and having a slowing contour; and
   a movable rocker engaging with the slowing wheel;
   wherein the slowing wheel is adapted to cause the rocker to move abutting against the slowing contour on the slowing wheel in response to the rotation of the shaft, so as to slow down the rotation of the shaft;
   wherein the slowing wheel comprises a slot, and the slowing contour is provided on the slot;
   wherein the rocker comprises a pin adapted to slide along the slot and engage with the slowing contour; and
   wherein the slowing contour comprises at least one protrusion on a first side of the slot and at least one recess on an opposite second side of the slot, and the protrusion faces towards the recess.

2. The slowing mechanism of claim 1, wherein the slot is a circular slot, a center of a circular slot being on an axis of the shaft.

3. The slowing mechanism of claim 2, wherein the circular slot comprises a first end and an opposite second end along a circumference of the circular slot, and the slowing contour is provided-in a middle position between the first end and the second end, or, -adjacent to one of the first end and the second end.

4. The slowing mechanism of claim 1, wherein the protrusion comprises two drive surfaces adapted to apply a force on the pin to move the rocker in a first moving direction in response to the rotation of the shaft in two opposite rotation directions.

5. The slowing mechanism of claim 4, wherein the recess comprises two drive surfaces adapted to apply a force on the pin to move the rocker in a second moving direction opposite to the first moving direction in response to the rotation of the shaft in two opposite rotation directions.

6. The slowing mechanism of claim 1, wherein the protrusion is adapted to push the pin into the respective recess facing towards the protrusion, and the recess is adapted to push the pin back into the slot.

7. The slowing mechanism of claim 1, wherein the rocker is-pivotable around a pivot which is away from the pin, or -linearly movable.

8. The slowing mechanism of claim 6, further comprising a damping device for providing resistance against a movement of the rocker.

9. The slowing mechanism of claim 1, wherein the rocker comprises a counterweight.

10. The slowing mechanism of claim 1, further comprising a stroke controller coupled between the shaft and the slowing wheel and adapted to change an angle of rotation of the slowing wheel as compared to an angle of the rotation of the shaft.

11. The slowing mechanism of claim 10, wherein the stroke controller comprises at least one of the followings: a reduction gear, a linkage, and a Geneva wheel.

12. The slowing mechanism of claim 1, wherein the at least one slowing wheel comprises a plurality of slowing wheels fixed on the shaft, wherein each of the plurality of slowing wheels is coupled to a separate rocker.

13. A switching apparatus comprising at least one slowing mechanism, comprising:
- a shaft adapted to be rotatable in response to an operation of an actuator to drive a moving element of the switching apparatus;
- at least one slowing wheel fixed on the shaft and having a slowing contour; and
- a movable rocker engaging with the slowing wheel;
- a first slowing mechanism and a second slowing mechanism;
- wherein the slowing wheel is adapted to cause the rocker to move abutting against the slowing contour on the slowing wheel in response to the rotation of the shaft, so as to slow down the rotation of the shaft;
- wherein the switching apparatus further comprises:
  - a first moving contact coupled to the shaft of the first slowing mechanism and adapted to connect and disconnect a first power supply; and
  - a second moving contact coupled to the shaft of the second slowing mechanism and adapted to connect and disconnect a second power supply.

14. The switching apparatus of claim 13, wherein the switching apparatus is a dual power supply automatic transfer switch.

15. The slowing mechanism of claim 5, further comprising a stroke controller coupled between the shaft and the slowing wheel and adapted to change an angle of rotation of the slowing wheel as compared to an angle of the rotation of the shaft.

* * * * *